United States Patent Office 3,254,292
Patented May 31, 1966

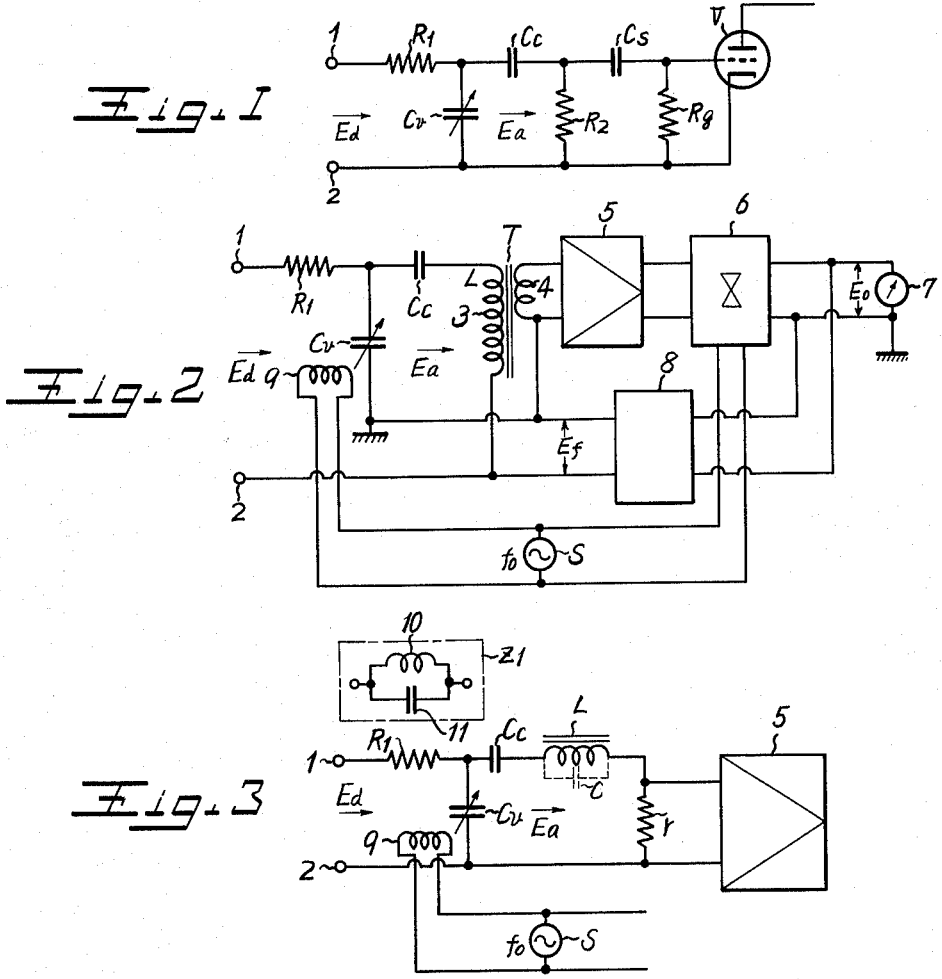

3,254,292
DYNAMIC CAPACITOR TYPE D.C.-A.C.
CONVERTER
Shuiti Ōhata, Tokyo, Japan, assignor to Kabushikikaisha Yokogawa Denki Seisa-Kusco (Yokogawa Electric Works Ltd.), Musashino-shi, Tokyo, Japan, a corporation of Japan
Filed Apr. 18, 1962, Ser. No. 188,470
Claims priority, application Japan, Apr. 28, 1961, 36/15,043
9 Claims. (Cl. 321—45)

This invention relates to a dynamic capacitor type D.C.-A.C. converter, and more particularly to such a novel dynamic capacitor type D.C.-A.C. converter, conversion efficiency of which is much increased by inserting a tuning circuit in an output circuit of the converter.

One object of this invention is to provide a dynamic capacitor type D.C.-A.C. converter which has a very high D.C.-A.C. conversion efficiency.

Another object of this invention is to provide a simple dynamic capacitor type D.C.-A.C. converter which has a small output impedance and which can be transistorized with decreased noises.

A further object of this invention is to provide a dynamic capacitor type D.C.-A.C. converter in which a phase-shifter connected to a synchronous rectifying circuit may be dispensed with.

Other objects, features and advantages of this invention will become apparent from the following description taken in conjunction with the accompanying drawings, in which;

FIGURE 1 is a circuit diagram of a dynamic capacitor type D.C.-A.C. converter heretofore used;

FIGURE 2 is a circuit diagram illustrating an example of a converter of this invention which is applied to an electrometer;

FIGURE 3 is a circuit diagram illustrating the essential part of another modification of this invention;

FIGURE 4 is a circuit diagram illustrating the essential part of a simplified embodiment of this invention; and FIGURE 5 is a circuit diagram illustrating the main part of another embodiment of this invention.

FIGURE 1 is an electric circuit diagram showing the essential part of a conventional dynamic capacitor type D.C.-A.C. converter, a D.C. voltage $Ed$ impressed across input terminals 1 and 2 is supplied across electrodes of a dynamic capacitor $Cv$ through a high resistance element or capacitor $R_1$. The electrode plates of the said capacitor being mechanically vibrated at a frequency $f_0$, and A.C. electromotive force $Ea$ having the frequency $f_0$ is generated across both ends of the capacitor $Cv$ due to the said D.C. voltage $Ed$. This voltage $Ed$ is applied through a coupling capacitor $Cc$ to an input circuit of a first amplifier vacuum tube V of an amplifier circuit. $R_2$ is a high resistance element, $Cs$ is a D.C. stopping capacitor and $Rg$ is a grid leak resistor of the first amplifier vacuum tube. If now the ratio of the converted A.C. voltage $Ea$ (R.M.S.) to the input D.C. voltage $Ed$ is defined as a conversion efficiency $\eta$, the conversion efficiency $\eta$ of this kind of converters now on the market is generally lower than 10 percent. Furthermore, it has been required that a vacuum tube having a very small grid current and low microphonic noise and shot noise be used at a first stage of an A.C. amplifier circuit to be connected to the output side of the converter. This invention is intended to avoid the aforementioned disadvantages.

Referring now to the drawings, this invention will hereinafter be explained. FIGURE 2 is an electric circuit diagram of the converter of this invention applied to an electrometer, wherein a primary winding 3 of a transformer T, instead of the high resistance element $R_2$ in FIGURE 1, is connected to an output end of the converter including the high resistance element $R_1$, the dynamic capacitor $Cv$ and the coupling capacitor $Cc$. One electrode of the dynamic capacitor $Cv$ is vibrated mechanically at the frequency $f_0$ by an electromagnetic driving coil 9 energized by a power source S of the frequency $f_0$ and its capacitance is varied in response to the vibration. As another device for mechanically vibrating the electrodes of the dynamic capacitor $Cv$, for instance, a piezoelectric driving device, or the like may be used. Accordingly, a piezo driven tuning fork type dynamic capacitor device in which a pair of electrodes of the dynamic capacitor are supported respectively by the two legs of the fork on which piezo-electric pieces are respectively mounted and the piezo-electric pieces are respectively connected to the input and output sides of an amplifier so that the tuning fork is vibrated mechanically can be used instead of the above mentioned electro-magnetic driven dynamic capacitor device. In this invention, the primary winding 3 of the transformer T and aforesaid capacitors $Cv$ and $Cc$ form a series circuit, and electric constants of the respective circuit elements are selected in such a way that the resonance frequency of the said series circuit is unequal to but nearly coincides with the driving frequency $f_0$ of the dynamic capacitor $Cv$. The A.C. voltage $Ea$ converted by the above converter is picked up at a secondary coil 4 through the transformer T and then added to an input terminal of an A.C. amplifier circuit 5. The output of the aforementioned amplifier circuit 5 supplied to a synchronous rectifier circuit 6 which is driven by the power source S of the same frequency $f_0$ as the driving frequency of the aforesaid dynamic capacitor $Cv$ and the rectifier output voltage $Eo$ of the said rectifier circuit 6 is indicated by an indicator 7. The rectifier output voltage $Eo$ is led into a feedback circuit 8 and an output voltage $Ef$ of the said circuit 9 is negatively fed back to an input side of the converter. It must be noted that the resistance $R_1$ is preferably inserted for maintaining the resonance of the series resonance circuit when a device to be measured having a comparatively low impedance is connected across the input terminals 1 and 2.

Numerical values in such a D.C.-A.C. converter as described above will be given as follows:

*Example I*

When $R_1 = 200\text{M}\Omega$
$Cc = 10$ pf. (10 mmfd.)
$L = 500$ h. (inductance of the primary winding 3)
$Cv = 15$ pf. (at standstill)
$f_0 = 2000$ c./s.

a measured value of the conversion efficiency $\eta$ goes up to 150% sufficiently higher than 100%.

*Example II*

When $R_1 = 500\text{M}\Omega$
$Cv = 10$ pf. (at standstill)
$L = 125$ h. (inductance of the primary winding 3)
$Co = 24$ pf. (stray capacity of primary winding 3)
$Cc = 12.5$ pf.
$f_0 = 2.5$ kc.

the following table can be obtained.

| A | $\eta_1$ | $\eta_2$ |
|---|---|---|
| Percent | Percent | Percent |
| 10 | 160 | 75 |
| 20 | 330 | 150 |
| 30 | 580 | 235 |
| 40 | 1,060 | 350 |
| 50 | ------- | 500 |
| 55 | ------- | 610 |

Where:

$A = d/D$ $D$ = distance between the two electrodes of the capacitor $Cv$ at standstill $d$ = deviation distance of the vibrating electrode of the capacitor $Cv$ $\eta_1$ = conversion efficiency When $$Q_1 = 100$$
$$Q_2 = 15$$

$Q_1 = Q$ of the transformer T $Q_2$ = equivalent to Q of the transformer T observed at $Cv$ through $Cc$ including the loss of $R_1$.

$\eta_2$ = conversion efficiency when $$Q_1 = 66.5$$
$$Q_2 = 6.5$$

It will be seen from the table that the conversion efficiency of the device according to this invention is far over 100%. Further, it has been found that a complete proportional relation is established between the input voltage $Ed$ and output voltage $Eo$ in such an electrometer as described above. Moreover, it is another advantage of this invention that the design of the input circuit in the A.C. amplifier circuit can be simplified. That is, by increasing sufficiently a step-down ratio between the primary and secondary windings of the transformer T, an amplifier circuit of low input impedance may be connected to the secondary winding 4. For example, it is possible to transistorize the A.C. amplifier circuit 5 and noises caused by the vacuum tube circuit can be reduced and its power source circuit can be simplified. In the conventional converter illustrated in FIGURE 1 a phase difference occurs between the voltage of the power source for driving dynamic capacitor $Cv$ and that of the voltage $Ea$, hence it is required that when the synchronous rectifier and the capacitor $Cv$ are operated by the same power source so as to effect synchronous rectification of the A.C. output voltage a phase shifting circuit is always inserted in an operating current supplying circuit of the rectification circuit.

In the case the above mentioned piezo driven tuning fork type dynamic capacitor device is used in this invention, however, a driving voltage of the dynamic capacitor $Cv$ and the converter A.C. voltage are out of phase of each other by about 90° and the said A.C. voltage is further phase-shifted by 90° by the transformer T and hence the phase difference between the driving voltage of the synchronous rectifier circuit 6 and that of the capacitor $Cv$ becomes 0° or 180°. Therefore, the phase-shifting circuit to be connected to the synchronous rectifier circuit can be dispensed with. In the D.C.-A.C. converter of this invention, by employing the piezo-electric driving device as a method of driving the electrode plates of the dynamic capacitor, electric shielding of the whole device can be more simplified. For this purpose a piece of material such as barium titanate ceramic can be used in the tuning fork or as tuning pieces. That is, in this case, a simple electro-static shielding is satisfactory to shield the parts including the dynamic capacitor in respect to the electric power source of the device and external circuits and accordingly there occurs no electromagnetic coupling between the tuning inductance element 3 which is to be connected to the output side of the converter and the driving coil 9 of the dynamic capacitor.

FIGURE 3 is a circuit diagram showing another embodiment of this invention, in which an A.C. voltage $Ea$ converted by the dynamic capacitor $Cv$ is applied to a series circuit of a coupling capacitor $Cc$, an inductance coil L and a low resistance element $r$ which expresses a low input impedance of an A.C. amplifier 5. The series resonance obtained by the dynamic capacitor $Cv$, the coupling capacitor $Cc$ and the inductance L is the same as that described with reference to FIGURE 2. In this case, however, a parallel tuning circuit $Z_1$ for the frequency $f_0$ consisting of an inductance element 10 and a capacitor element 11 may well be connected instead of the high resistance element $R_1$ of the input side. At this time, only the inductance element 10 and its resonance impedance of the parallel resonance circuit $Z_1$ correspond to the high resistance $R_1$ in FIGURE 2 and hence a value of its input resistance can be neglected when connected to a circuit to be measured having a comparatively low impedance. Accordingly, undesirable noise such as thermal agitation noise due to the input resistance becomes sufficiently small so that the converter in this example can be used without error in measuring a circuit having a low impedance at much higher sensitivity.

It will be appreciated that the above parallel resonance circuit $Z_1$ can be also used instead of the resistance $R_1$ in the device shown in FIG. 2 and $R_1$ in the devices herein referred to in FIGS. 4 and 5.

Furthermore, it is possible that a capacitor C is connected to the aforementioned inductance L as illustrated by a dotted line for facilitating the fine tuning of the resonance. For the same ends, similar capacitor can be connected in parallel with the primary winding 3 or secondary winding 4 of the transformer in FIG. 2 and to the inductance coil L in FIG. 4.

FIGURE 4 is a circuit diagram illustrating another embodiment of this invention, in which an A.C. voltage induced across both ends of a tuning inductance coil L is supplied directly to an input side of an A.C. amplifier circuit 5. In an embodiment shown in FIGURE 5, a quartz resonator or a piezo electric resonator device X is used instead of the inductance coil L in FIGURE 4 and an electric equivalent series inductance of the said resonator device X is utilized.

With connection of the tuning inductance element in series with the output side as described above, the conversion efficiency of a D.C.-A.C. converter of this invention is appreciably increased and an input circuit of the A.C. amplifier circuit connected to the said converter can be made of a low impedance, if required, so that the device of this invention is suitable as a D.C.-A.C. converter for an electrometer, PH meter or a device which requires high input resistance.

It will be apparent that many modifications and variations may be effected without departing from the scope of the novel concepts of this invention.

What is claimed is:

1. A dynamic capacitor type D.C.-A.C. converter comprising a dynamic capacitor at least one electrode of which is constructed so as to be mechanically vibrated, means for establishing the vibration of said dynamic capacitor, and a series resonance circuit including said dynamic capacitor, a coupling capacitor and an inductance element all connected in series with one another, the resonant frequency of said series resonance circuit being unequal to but nearly coinciding with said driving vibration frequency of said dynamic capacitor.

2. A dynamic capacitor type D.C.-A.C. converter comprising a dynamic capacitor at least one electrode of which is constructed so as to be mechanically vibrated, means for establishing the vibration of said dynamic capacitor, a series resonance circuit including said dynamic capacitor, a coupling capacitor and a primary winding of a step down transformer all connected in series with one another, the resonant frequency of said series resonance circuit being unequal to but nearly coinciding with said driving vibration frequency of said dynamic capacitor, and a load connected to the secondary winding of said transformer.

3. A dynamic capacitor type D.C.-A.C. converter comprising a dynamic capacitor at least one electrode of which is constructed so as to be mechanically vibrated, means for establishing the vibration of said dynamic capacitor, a series resonance circuit including said dynamic capacitor, a coupling capacitor and an inductance element all connected in series with one another, the resonant frequency of said series resonance circuit being unequal to but nearly coinciding with said driving vibration frequency of said dynamic capacitor, and an impedance which is inserted in the input side with respect to said dynamic capacitor for maintaining the resonance of said series resonance circuit when a device to be measured having a comparatively low impedance is connected in said input circuit.

4. A dynamic capacitor type D.C.-A.C. converter comprising a dynamic capacitor at least one electrode of which is constructed so as to be mechanically vibrated, means for establishing the vibration of said dynamic capacitor, a series resonance circuit including said dynamic capacitor, a coupling capacitor and an inductance element all connected in series with one another, the resonant frequency of said series resonance circuit being unequal to but nearly coinciding with said driving vibration frequency of said dynamic capacitor, and a parallel resonance circuit for the driving vibration frequency inserted in the input side with respect to said dynamic capacitor.

5. A dynamic capacitor type D.C.-A.C. converter comprising a dynamic capacitor at least one electrode of which is constructed so as to be mechanically vibrated, means for establishing the vibration of said dynamic capacitor, and a series resonance circuit including said dynamic capacitor, a coupling capacitor, an inductance element and a load all connected in series with one another, the resonant frequency of said series resonance circuit being unequal to but nearly coinciding with said driving vibration frequency of said dynamic capacitor.

6. A dynamic capacitor type D.C.-A.C. converter comprising a dynamic capacitor at least one electrode of which is constructed so as to be mechanically vibrated, means for establishing the vibration of said dynamic capacitor, a series resonance circuit including said dynamic capacitor, a coupling capacitor and an inductance element all connected in series with one another, the resonant frequency of said series resonance circuit being unequal to but nearly coinciding with said driving vibration frequency of said dynamic capacitor, and a load connected across said inductance element.

7. A dynamic capacitor type D.C.-A.C. converter comprising a dynamic capacitor at least one electrode of which is constructed so as to be mechanically vibrated, means for establishing the vibration of said dynamic capacitor, a series resonance circuit including said dynamic capacitor, a coupling capacitor and a resonance element such as a piezo electric resonator, the resonant frequency of said series resonance circuit being unequal to but nearly coinciding with said driving vibration frequency of said dynamic capacitor, and a load connected across said resonance element.

8. A dynamic capacitor type D.C.-A.C. converter as claimed in claim 1 wherein said means for establishing the vibration of said dynamic capacitor comprises, a device which is piezo-electrically driven, at least one of the electrodes of said dynamic capacitor being mounted on said device.

9. A dynamic capacitor type D.C.-A.C. converter as claimed in claim 7, wherein said means for establishing the vibration of said dynamic capacitor comprises a device which is piezo-electrically driven, at least one of the electrodes of said dynamic capacitor being mounted on said device.

References Cited by the Examiner
UNITED STATES PATENTS

| | | | |
|---|---|---|---|
| 2,341,632 | 2/1944 | Libby | 317—250 |
| 2,571,746 | 10/1951 | Mouzon | 321—45 |
| 2,586,603 | 2/1952 | Beggs et al. | 321—45 |
| 3,015,764 | 1/1962 | Young | 321—45 |

LLOYD McCOLLUM, Primary Examiner.

A. J. GAJARSA, M. L. WACHTELL,
Assistant Examiners.